US009240748B2

(12) United States Patent
Mao

(10) Patent No.: US 9,240,748 B2
(45) Date of Patent: Jan. 19, 2016

(54) DYNAMICALLY RECONFIGURABLE MOTOR AND GENERATOR SYSTEMS

(71) Applicant: Hengchun Mao, Allen, TX (US)

(72) Inventor: Hengchun Mao, Allen, TX (US)

( * ) Notice: Subject to any disclaimer, the term of this patent is extended or adjusted under 35 U.S.C. 154(b) by 9 days.

(21) Appl. No.: 14/185,892

(22) Filed: Feb. 20, 2014

(65) Prior Publication Data

US 2014/0265994 A1    Sep. 18, 2014

Related U.S. Application Data

(60) Provisional application No. 61/852,335, filed on Mar. 15, 2013.

(51) Int. Cl.
| | |
|---|---|
| *H02P 25/22* | (2006.01) |
| *H02P 21/00* | (2006.01) |
| *H02K 3/28* | (2006.01) |
| *H02P 25/18* | (2006.01) |

(52) U.S. Cl.
CPC ........ *H02P 25/22* (2013.01); *H02K 3/28* (2013.01); *H02P 21/0089* (2013.01); *H02P 25/188* (2013.01)

(58) Field of Classification Search
CPC ......... H02P 21/0089; H02P 1/26; H02P 1/32; H02P 25/22; H02P 25/188; B26B 19/282; G01R 19/282; B60L 11/1807; G05D 23/27537; H02K 17/14; H02K 3/28
USPC .......................................................... 318/773
See application file for complete search history.

(56) References Cited

U.S. PATENT DOCUMENTS

| | | | | |
|---|---|---|---|---|
| 6,647,325 | B2 * | 11/2003 | Shimazaki et al. ............. | 701/22 |
| 7,786,643 | B2 * | 8/2010 | Bade et al. ..................... | 310/184 |
| 7,843,078 | B2 * | 11/2010 | Santiago et al. ................ | 290/44 |
| 8,183,814 | B2 * | 5/2012 | Fuchs ........................... | 318/524 |
| 8,816,620 | B2 * | 8/2014 | Pricop et al. ............. | 318/400.09 |
| 2009/0134734 | A1 * | 5/2009 | Nashiki ......................... | 310/162 |
| 2011/0241599 | A1 * | 10/2011 | Nashiki et al. ................ | 318/724 |
| 2013/0214623 | A1 * | 8/2013 | Yang et al. ..................... | 310/46 |

* cited by examiner

Primary Examiner — Michael Zarroli

(57) ABSTRACT

An electrical machine comprises a rotor, and a stator magnetically coupled to the rotor. The stator has a plurality of slots and a plurality of windings, and each winding is installed in a corresponding slot. A plurality of magnetic poles and a plurality of phases in each pair of poles are formed when currents flow through the windings. The windings are so configured that the number of phases and the number of poles can be dynamically adjusted.

20 Claims, 11 Drawing Sheets

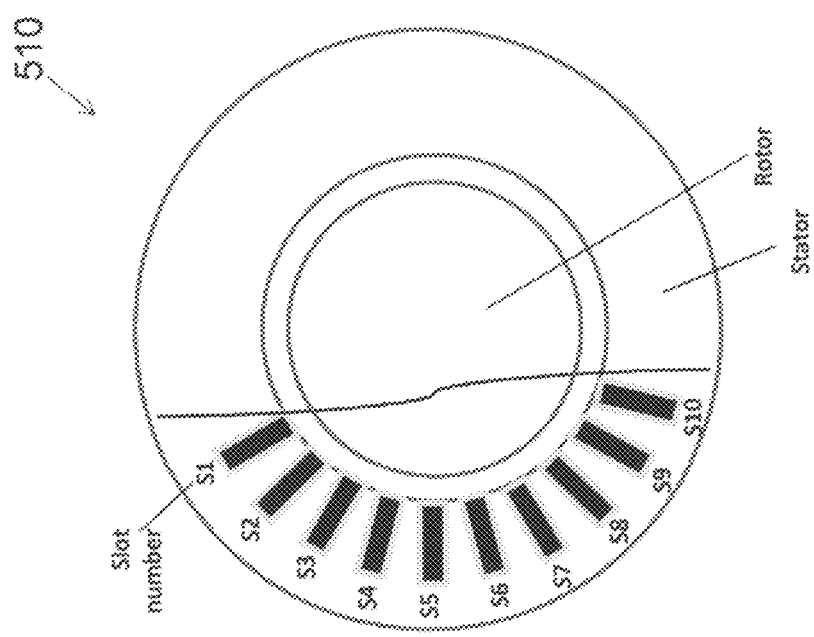

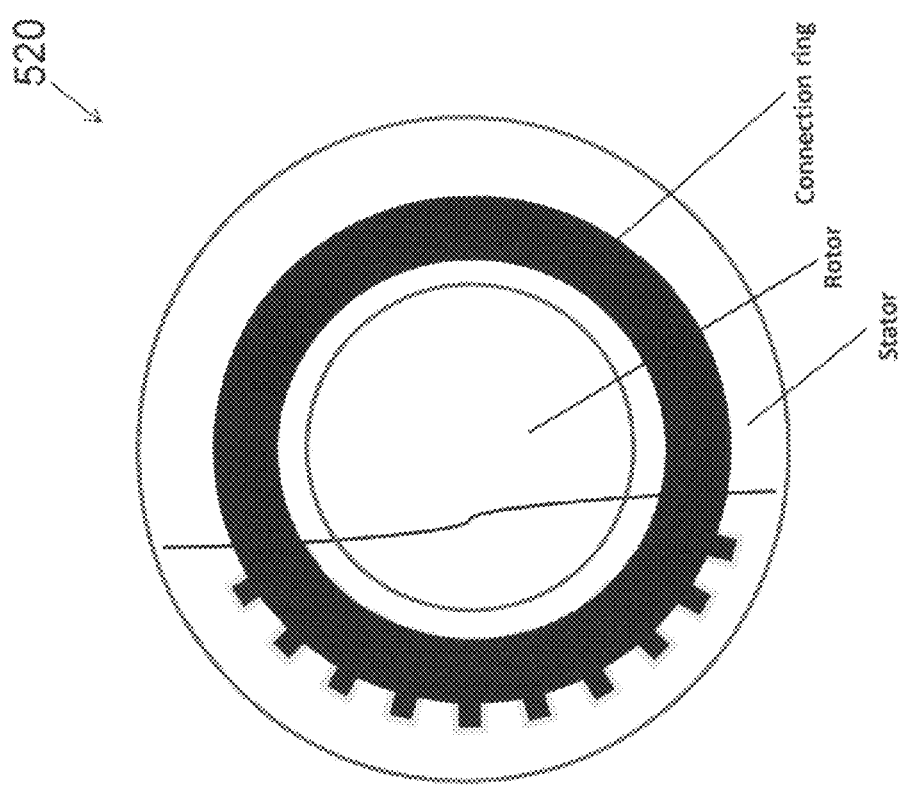

DYNAMICALLY RECONFIGURABLE MOTOR AND GENERATOR SYSTEMS

CROSS REFERENCE TO RELATED APPLICATIONS

This application is related to, and claims priority to U.S. Provisional Application No. 61/852,335, titled, "Motor and Generator Systems Optimized with Power Electronics" filed on Mar. 15, 2013, which is herein incorporated by reference.

TECHNICAL FIELD

The present invention relates to electrical drives and controls, and, in particular embodiments, to novel motor and generator structures, and the use of novel power electronics equipment to drive and control them.

BACKGROUND

Electrical machines (motors and generators) are widely used to process energy and power equipment. Many of their applications require the motors and generators to operate at variable speed. Power electronics equipment is also used to operate with the motors and generators in such variable speed systems, including but not limited to industrial drives, electrical vehicles, diesel-generator sets, and wind power generation. There is a strong desire to increase the efficiency of such systems, while reducing its cost and size, especially for demanding applications such as electrical cars and other transportation equipment.

Unfortunately, the motor, generator and power electronics equipment in variable speed systems usually adopted standard technologies in each area, and are usually not optimized as a whole to achieve best results. For example, so far the vast majority of the motors and generators have a three-phase structure, and the power converters working with them are of a three-phase structure too. Significant improvement is needed to further optimize system performance and reduce the system cost.

SUMMARY OF THE INVENTION

These and other problems are generally solved or circumvented, and technical advantages are generally achieved, by preferred embodiments of the present invention which provides an improved resonant power conversion.

In accordance with an embodiment, an electrical machine comprises a rotor, and a stator magnetically coupled to the rotor and having a plurality of slots and a plurality of windings, wherein each winding is installed in a corresponding slot, a plurality of magnetic poles and a plurality of phases in each pair of poles are formed when currents flow through the windings, and the windings are so configured that the number of phases and the number of poles can be dynamically adjusted.

In accordance with another embodiment, a system comprises a motor having a stator, wherein the stator has a plurality of slots, and each slot has a winding in it, and wherein the windings are so configured that the number of phases and the number of poles of the motor can be dynamically adjusted, and a power electronics system comprising a control system and a plurality of power converters, wherein a power converter is coupled to a corresponding winding, and the control system is so configured that the number of poles and the number of phases of the motor are dynamically adjusted.

In accordance with yet another embodiment, a method comprises providing a power electronics system to have a plurality of power converters and a control system, and controlling winding currents of a motor so that the motor has a first number of poles at a higher speed, and a second number of poles at a lower speed, wherein the first number is lower than second number, and the number of phases in a pair of poles is adjusted in response to a change of the number of poles.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5A illustrates a connection end of a stator of a slot-configurable motor in accordance with various embodiments of the present disclosure;

FIG. 5B illustrates a shorted end of a stator of a slot-configurable motor in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in a motor and motor drive system. The invention may also be applied, however, to a variety of other electrical machine and machine control systems, including generators, rectifiers, and inverters, and any combination thereof. Hereinafter, various embodiments will be explained in detail with reference to the accompanying drawings.

A variable speed system usually controls a motor to operate at or around its synchronous speed. The synchronous speed of an ac electrical machine (motor or generator) is determined by the frequency of the power supply and the number of poles of the motor according to the following relationship:

$$s = \frac{60f}{P},$$

in which S is speed in rpm, f is the power supply frequency in Hz, and P is the number of pairs of poles of the motor or generator.

Figure 1:
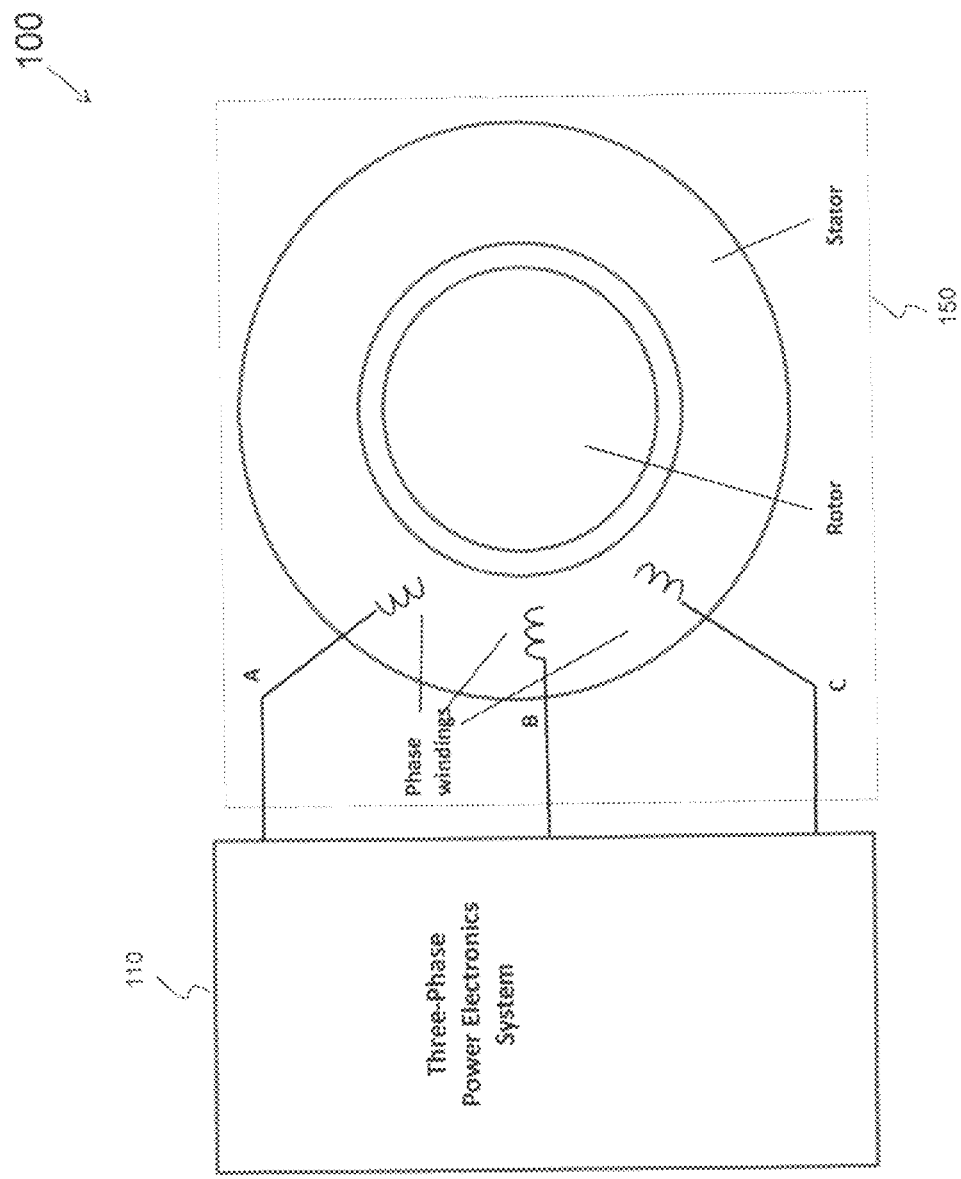
FIG. 1 illustrates a three-phase drive system with a three-phase motor and power electronics system.

Most variable speed applications use variable frequency in the power supply as the main control method, but keep the pole number constant. When the speed range is wide, the frequency range is also wide. Unfortunately, neither power electronics equipment nor motors (and generators) are good at wide frequency ranges, and usually low frequency operation and high frequency operation present big challenges to the design of power converters, motors, and generators. This often results in suboptimal performance and increases cost, volume and weight of the system. Moreover, motors and generators above a few kW are usually designed in a three-phase configuration with fixed number of poles, as is shown in FIG. 1, where a three-phase power electronics system 110 is used to power a three-phase motor 150. A three-phase motor has a rotor, a stator, and a three-phase winding consisting three phase windings (one phase winding per phase). In high power applications, each phase has to deal with high voltage and high current, which not only increases insulation and cabling requirements in the motor and the system, but also mandate parallel and/or series connection of power devices and converters in the power electronics equipment. As power semiconductor devices cannot be put in parallel or in series without extra effort, such parallel or series connection further increases the cost and the complexity of the power electronics equipment.

Figure 2:
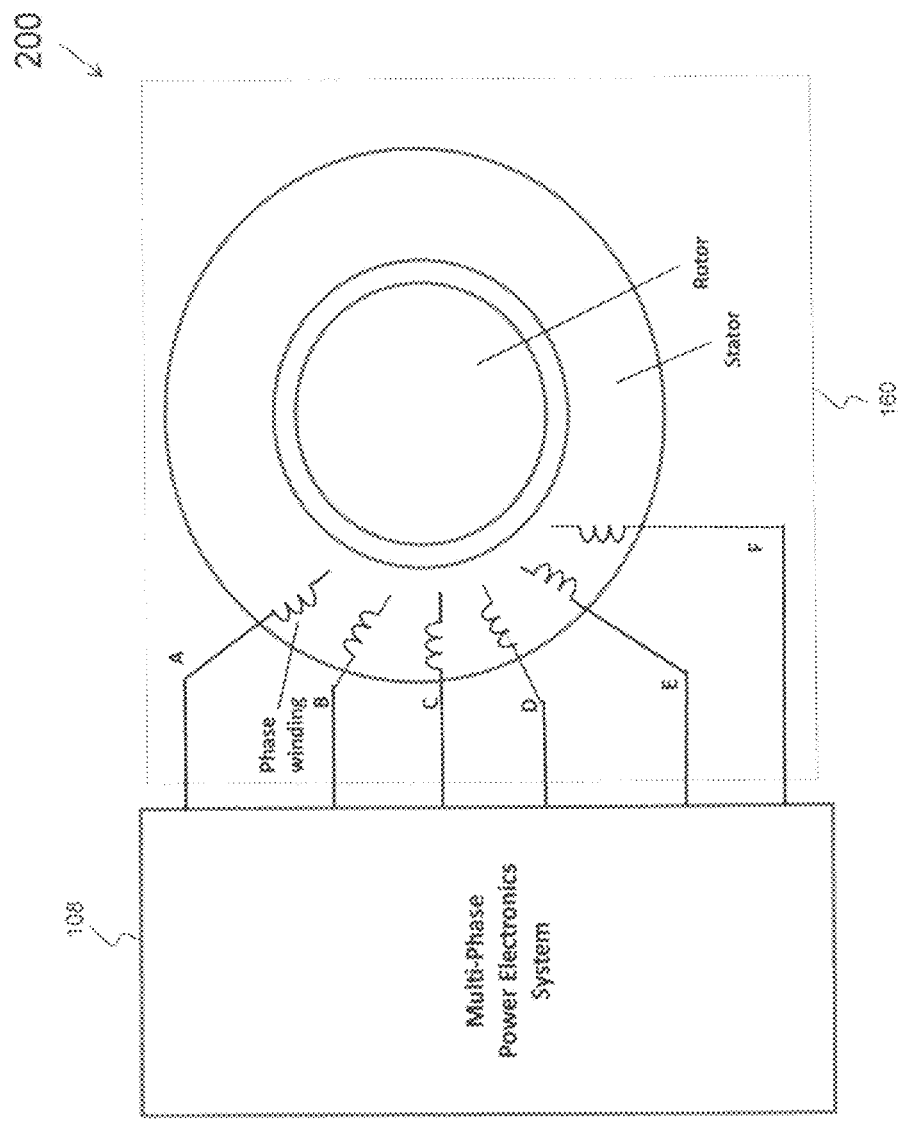
FIG. 2 illustrates a multi-phase drive system with a multi-phase motor and power electronics equipment in accordance with various embodiments of the present disclosure.
Figure 3:
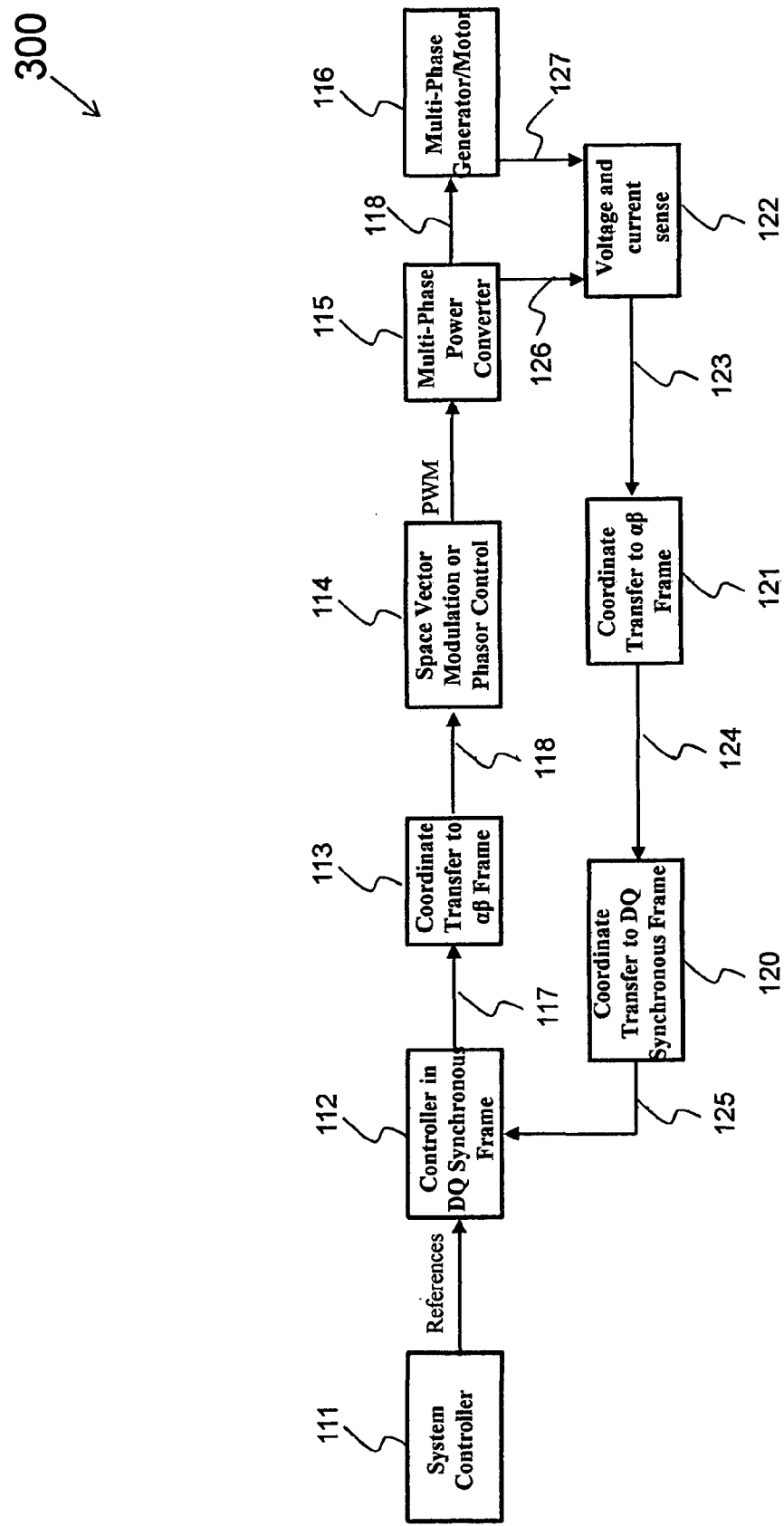
FIG. 3 illustrates a control system for a multi-phase drive system in accordance with various embodiments of the present disclosure.

To alleviate this problem, the number of phases in a high power application can be increased, so each phase processes lower power which can be handled easier by power semiconductor switches. Such a system is shown in FIG. 2, where a multi-phase power electronics system 108 powers a multi-phase motor 160. The number of phase windings of 160 is higher than 3, so each phase winding and related power electronics components in 112 deal with lower power than in a three-phase system. The voltage and current in adjacent phases of an m-phase system have a phase shift of 360°/m, where m represents the number of phases in the system. Physically, m phase windings are evenly distributed in the space of a pair of poles. FIG. 2 shows a six-phase system with six windings distributed in a complete region of two poles. The phases are labeled A, B, C, D, E, and F. The windings of the same phase in different pairs of poles can be put either in series or in parallel (not shown in the drawing), so the interconnection with the power source can be easier. FIG. 3 shows a block diagram of the control system for a multi-phase system. The system controller 111 provides system control function, and may outputs system parameters such as speed, torque, power delivered to the output etc. The output of this block is the references for the power electronics subsystem, which may include reference signals for frequency, voltages, and currents. 112 is the compensation block of the power converters. In one preferred embodiment, 112 deals with phase variables. In another preferred embodiment, block 112 is in a DQ synchronous frame so main control variables are in dc values in steady state. The phase voltages and currents in the power converter and the motor or generator are sensed when necessary. In a preferred embodiment, such variables are transferred into the αβ frame first through a coordinate transfer block 121 to get a general phasor presentation 124. Then through another coordinate transfer block 120 the feedback signal 124 may be transferred into the DQ frame to have a DQ presentation 125. These coordinate transfers are well known in the industry. After compensation in the DQ frame controller 112, control output 117, which may include voltage commands, are transferred into a of presentation 118 through coordinate transfer block 113. A modulation block 114 is used to generate PWM control signals from the phasor presentation. In one preferred embodiment, 114 uses space vector modulation. The PWM signals controls the power switches in the power converter 115, which powers the motor 116. When the number of phases is high in the system, space vector modulation may be very complex. In such a case, it may be easier to use a phasor control scheme in the modulation block 114, in which the variables in the αβ frame can be presented as a general phasor in the form of:

$V = V_m e^{-j\theta}$, in which V is the general voltage vector, $V_m$ is the amplitude of the vector, and θ is the angle of the vector.

From the amplitude information and angle information, the phase voltages can be easily determined from the ideal phase relationship of phases in a multi-phase system. For example, in an m-phase system, the ith phase's voltage can be calculated from the following relationship:

$$V_j = V m \cos\left(\theta - \frac{(i-1)*360}{m}\right) + V_0,$$

in which $V_0$ is the zero-sequence component which can be set in the control system to optimize performance. Alternatively, instead of using zero-sequence component some 3rd and/or higher order harmonic components can be added to the above equation to obtain better performance.

Then PWM (pulse-width modulation) signal can be used to determine the duty cycles of the switches in each phase leg. The PWM switching signals are sent to the multi-phase power converter 115 to control the switches in the converter 115.

In a conventional multi-phase system, the number of phases is usually fixed. Though the number of poles may be reconfigured in a limited range by different connections of winding taps, such reconfiguration is usually static. Further improvements can be made to optimize the performance and cost tradeoffs. With an appropriate architecture of the power electronics system and an appropriate design of the electrical machine, in a preferred embodiment the number of phases and the number of poles can be dynamically reconfigured during operation.

Figure 4:
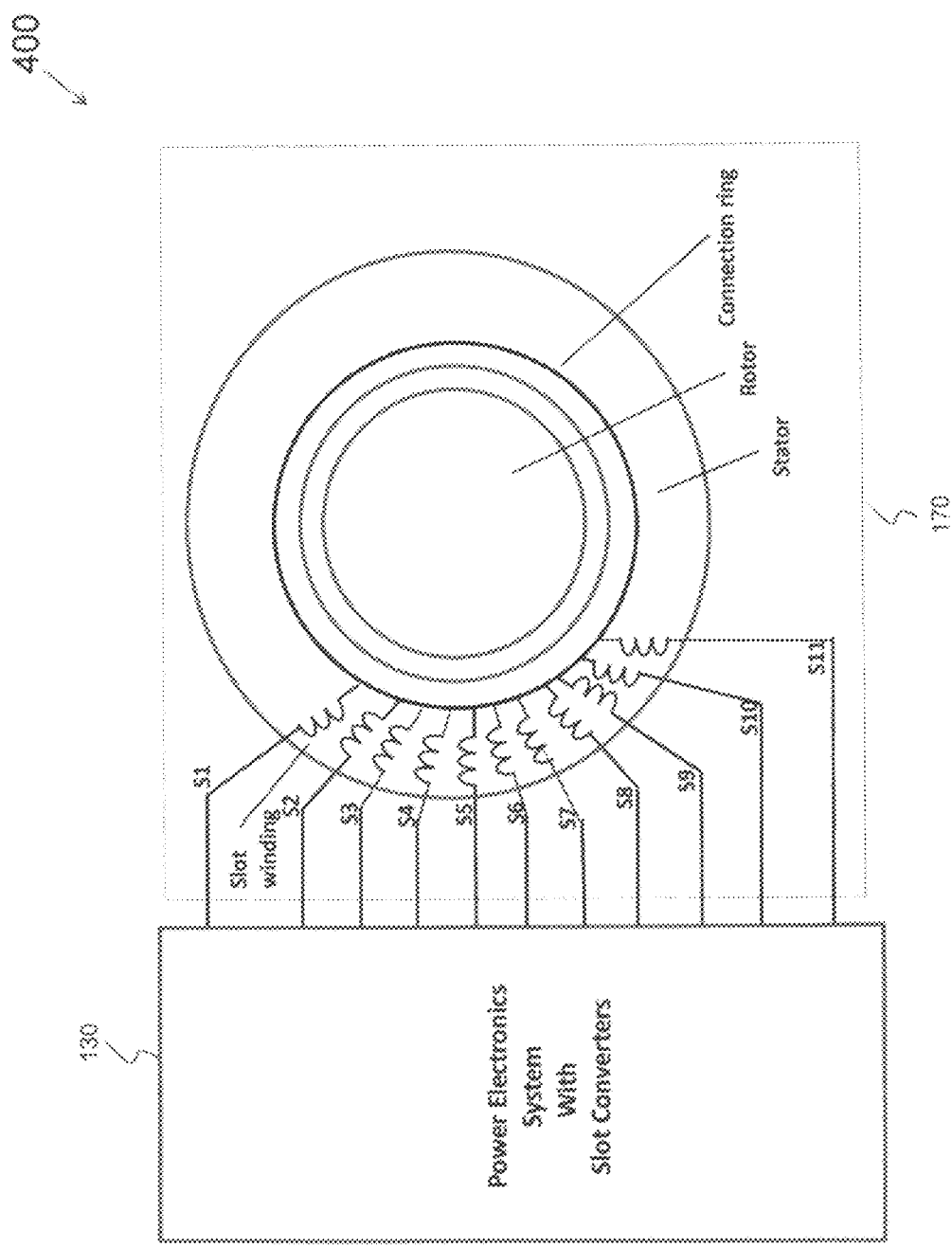
FIG. 4 illustrates a slot-based drive system with a slot-configurable motor and a slot converter based power electronics system in accordance with various embodiments of the present disclosure.

FIG. 4 shows an exemplary implementation. The reconfigurable motor 170 has many slots, labeled as S1, S2, and so on along the stator armature (but only a portion is shown in details in the figure for the sake of clearance). In each slot, there is a one-turn slot winding. The conductor in a slot may consist of one of multiple wires, or can be a solid piece of conductor, such as an Aluminum or Copper bar. The winding can be inserted into the slot, or casted or molded into the slot. Also, the conductors in adjacent slots can be put in parallel, and in such case the paralleled windings are treated as one winding in control and power perspective. At one end of the stator, all slot windings are connected to a connection ring, which basically shorts all slot windings on one end to form an equivalent star connection. The connection ring may be grounded by making one or more electrically conductive contacts to the metal case of the stator or other grounded structure. The other end of each slot winding is connected to a slot power converter of a power electronics system 105, which is basically a single-phase inverter or rectifier. Depending on the system requirement, a slot power converter can perform inverter functions, rectifier functions, or both. Because in this architecture, a slot winding is not committed to any particular pole or phase, the phases and poles of the machine can be dynamically reconfigured by controlling the phase relationship of the currents and voltages between the slot windings. By changing the phase relationship between the winding currents and voltages, different poles and phases can be established, and both the number of phases and the number of poles can be dynamically controlled. Therefore, a dynamically reconfigurable machine 170 with this embodiment structure can be called a universal motor (or generator), and a slot-based powering architecture should be used to fully employ the flexibility of such a machine.

FIG. 5A shows the connection end of the stator, where the slot windings are separated. FIG. 5B shows the shorted end of the stator, where a connection ring connects all slot windings together. A rotor is magnetically coupled to the rotor, and has rotor windings. The details of the rotor windings are not shown for simplicity. In a preferred embodiment, a squirrel cage rotor winding is used, so the phases and poles in the rotor can be automatically adapted to any stator configuration.

The following example shows the operation of adjusting phase and pole dynamically according to this disclosure. A motor with 60 slots in its stator may be configured to have 40 poles initially, and then each pair of poles has 3 slot windings. So initially it's a three-phase system, and the phase shift from a slot winding to an adjacent slot winding is 120° electrically. When according to the system requirement the motor is configured to have 10 poles, each pair of poles now has 12 slot windings. The 12 slot windings in a pair of poles can be configured as a 12-phase system with the slot phase shift being 30°, or as a 6-phase system with every pair of two adjacent slot windings working as one phase winding and with a phase shift of 60° between adjacent phase windings, or as a 4-phase or even 3-phase system. However, when more than one slot wings are assigned to one phase, there will be circulating current between the slot windings, and the efficiency and power capability is reduced. If a phase has only one slot winding, the motor's efficiency and power capability are kept at the highest. Moreover, different pairs of poles may have different numbers of phases. For example, in the above 60-slot motor, a 36-pole configuration can be achieved by having 6 pairs of poles have 4 phases (in 4 slots) in each pair, and 12 pairs of poles have 3 phases (in 3 slots) in each pair. With this uneven phase configuration, the pole number of the 60-slot example motor can be any even number from 2 to 40, so the synchronous speed at a given frequency can have a range of 20:1. In this way, the pole number is controlled to change in substantially fine steps, and there are a significant large number of steps (for example the maximum pole number is higher than ½ of slot number, and the minimum pole number may be 2 or 4). The power rating of the motor and associated power electronics system can be kept constant over the whole range.

Pole number control can be a significant part of a variable-speed control system. With the fine-step change of number of poles, the speed of a motor or generator can change over a wide range while the frequency of winding currents being in a narrow range, to optimize the system performances. In some applications which don't need precise speed regulation, the frequency of a power supply to a winding (thus the current in the winding) may be kept constant and speed control can be achieved with the change of pole numbers alone. This can result in better design of the power converter, especially in very high power applications where frequency change may be difficult or inefficient, for example in resonant topologies. In addition, because the control of pole number change is equivalent to a mechanical gear in changing the speed, mechanical gear boxes in a drive system can be eliminated, achieving better system efficiency, cost, size, and weight.

Because each slot of the universal motor may has only one winding with modest voltage rating, the insulation requirements of the machine and associated cabling are minimized. In addition, a low-cost manufacturing process similar to those used with the squirrel cage rotor in induction motors can be applied to the stator also. As a result, better performance and more power can be obtained in a machine with less cost, weight and volume. This makes the universal motors a good choice for challenging applications such as in electrical drives in vehicles, aircrafts, ships, and other industrial applications. And a universal generator with this technology is a suitable in wind power generation and other outdoor energy applications.

Figure 6:
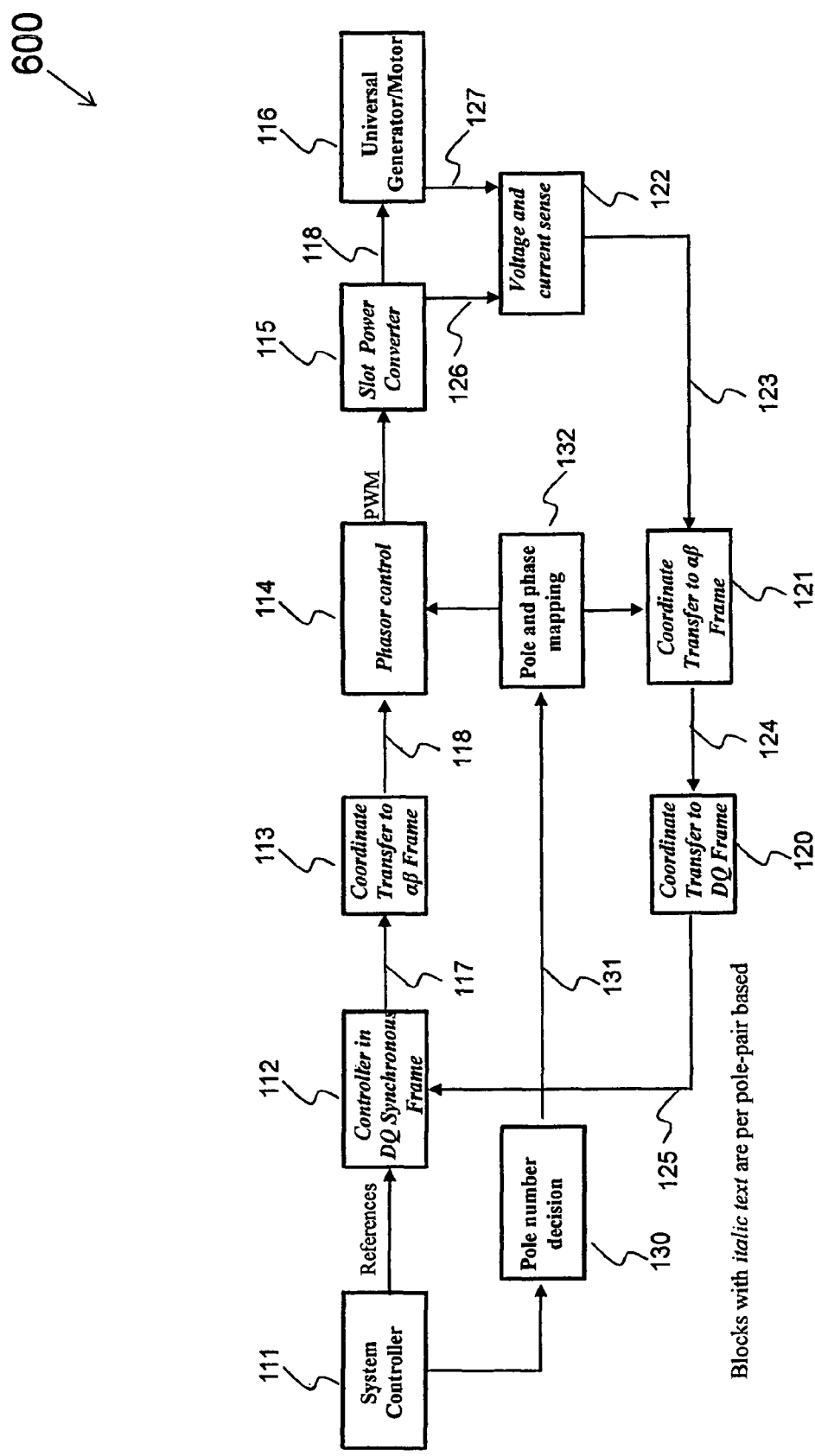
FIG. 6 illustrates a control system for a slot-based drive system shown in FIG. 4 in accordance with various embodiments of the present disclosure.

A control block diagram is shown in FIG. 6 for a universal motor with slot power converters. The general signal flow is similar to the method shown in FIG. 3, but a few blocks are added and changed. The selection of number of poles, through the pole number decision block 130, now plays an important role, and should be made considering the speed, power and frequency information. In one preferred embodiment, 130 is a separate block. In another preferred embodiment, the function of the block 130 may be part of the system controller. A pole and phase mapping block 132 may have a mapping table to decide slot assignment, and should be updated whenever there is a pole number or phase number change, so the slots are dynamically assigned to poles and phases. To explain the operation with the above 60-slot motor example, Slot S4 may be assigned initially to Pole Pair P2 as Phase A in the original 40-pole three-phase configuration. To move to a 36-pole configuration, a new assignment should be made. As discussed earlier, in a 36-pole configuration 6 pairs of poles may have 4 phases each, and 12 pairs of poles may have 3 phases each. Now pole pair P1 may have 4 phases, so slot S4 may be assigned to pole pair P1 as Phase D. The coordinate transfers between the $\alpha\beta$ frame and phase variables should use the information in the mapping table and be performed individually for each pair of poles, using pair of poles as a basic subsystem. Now the windings in each pair of poles should be collectively treated as a subsystem in a pole control module, and control functions related (especially the winding current control) all phase windings in a given pair of poles should be processed in the corresponding pole control module. The blocks in a pole control module are denoted with italic text in FIG. 6. Therefore, for a configuration with P pairs of poles, there will be P pole control modules, and all pole control modules should be processed in synch. Each pole control module can be treated as a thread in control software programs, and the whole control system now becomes a multi-thread process. It will require more computational resources than a conventional control system as is shown in FIG. 3. However, with the rapid progress of computer processing capability, the added resource requirement is not a significant burden, and is well justified considering the advantages the dynamic pole and phase configuration can bring to the system. In this way, the number of poles, number of phases in each pair of poles, and the frequency of windings currents can all be controlled simultaneously in a well-coordinated way to achieve smooth system operation.

Every slot winding of the universal motor or generator should be powered by a slot power converter 115. The slot power converter should be able to control its current and voltage under any condition. Considering the dynamic change of phase and pole association a slot winding can have, it's best that the voltage and current control be self-contained to the slot power converter. Therefore, instead of using space vector modulation which coordinates the control of all phases in a system, it's better to use the phasor control scheme discussed above with FIG. 3. To accomplish self-contained control, the zero-sequence component in phase voltage or current calculation should be set to zero, and if needed some $3^{rd}$ and/or higher order harmonic components can be added to increase the power capability and other performance.

Figure 7A:
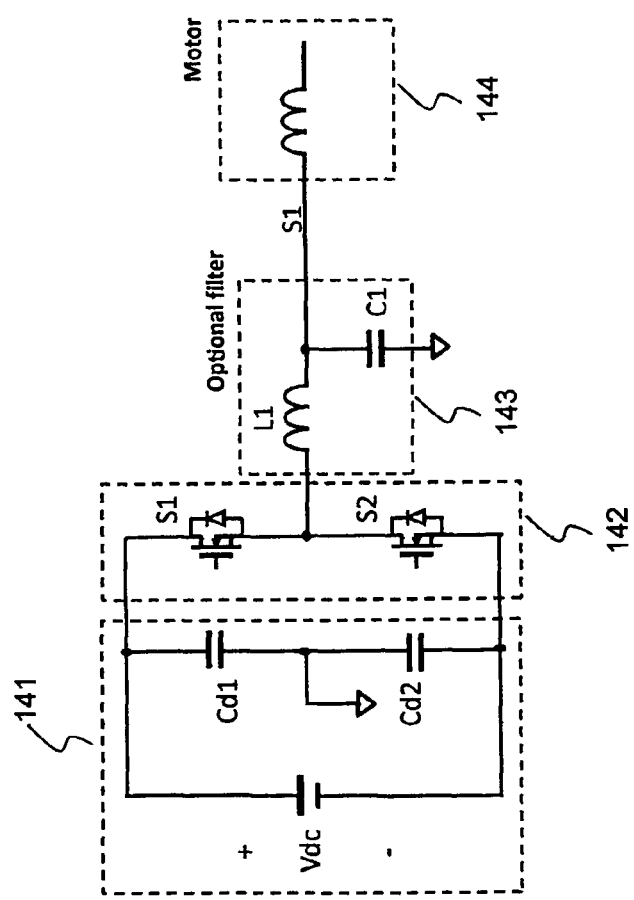
FIG. 7A illustrates a two-level slot power converter in accordance with various embodiments of the present disclosure.
Figure 7B:
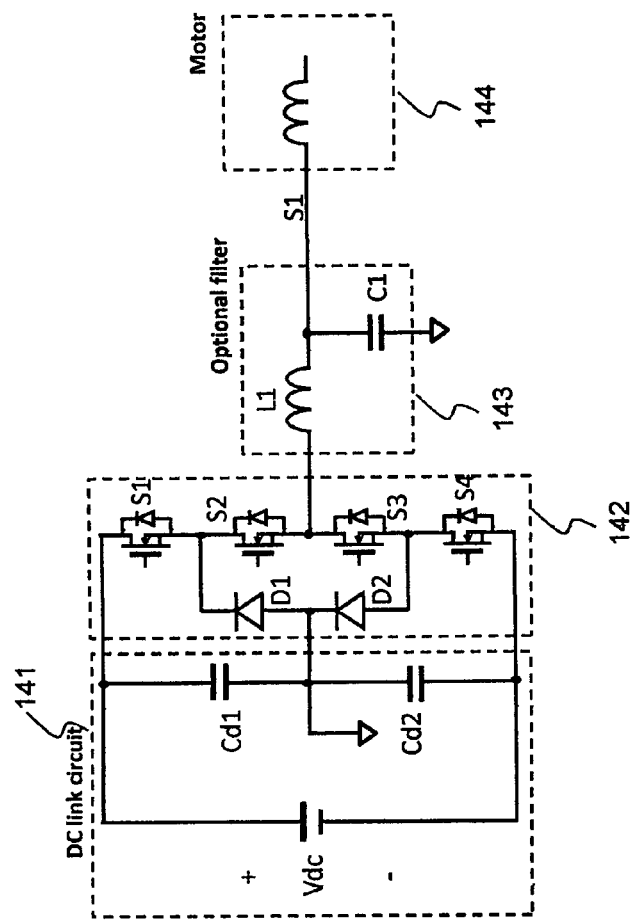
FIG. 7B illustrates a three-level slot power converter in accordance with various embodiments of the present disclosure.

FIGS. 7A and 7B shows two inverter topologies suitable for the slot power converter. FIG. 7A is a two-level converter, and FIG. 7B is a three-level converter. If high power is needed, multiple converters with these topologies can be paralleled (preferably interleaved in control), or higher-level topologies can be used. The operation principles of these topologies are well known, and do not need to be discussed here. The optional filter 143 consisting of inductor L1 and capacitor C1 can be used to reduce the current ripple and dv/dt supplied to the slot winding, so EMI can be reduced. Other filter configuration can also be used. The dc-link circuit uses one input power source Vin. If needed two input sources can also be used, with one across each of the input capacitors Cd1 and Cd2. Part or all of the dc-link circuit 141, consisting of the input source, input capacitors and possibly other filter circuit, can be shared by multiple slot converters or all slot converters in a system, to reduce the cost and complexity of the power system.

Due to the existence of many slots and slot converters, it's possible to optimize system performance by disabling some of the slots and their associated slot converters in certain conditions. For example, in light-load conditions, some slots can be powered off by de-activating the power converters (disabling the switching of power switches in the converters) to reduce power losses and improve efficiency. The disabled slots and de-activated converters can be used as a backup system for the active slots and converters, so the reliability and availability of the system can be improved.

Figure 8:
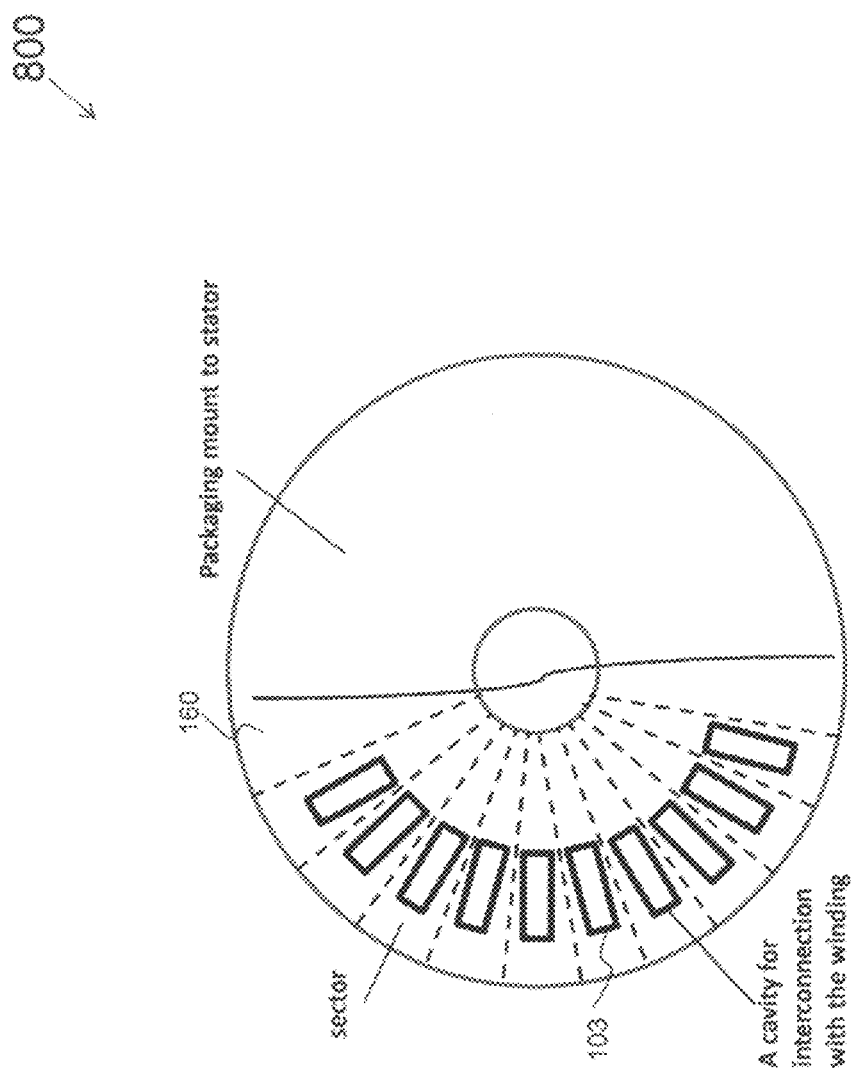
FIG. 8 illustrates an embodiment of a packaging technique in accordance with various embodiments of the present disclosure.

In some applications the large number of interconnections between the motor (generator) and the slot converters may present an issue. FIG. 8 shows a conceptual drawing of a packaging technique to alleviate the issue by minimizing the length of the interconnections. Part or all components of the slot converters are assembled on to a substrate 160, to become an assembled package. In one embodiment, the substrate 160 is as a printed circuit board (PCB). The substrate 160 is designed to have a suitable shape and size to reduce interference with the motor or generator operation, and is divided into many sectors, so each sector can be easily coupled to one or more slot windings through suitable connection means. The substrate may have cavities to allow the connection terminals of the slot windings to protrude through. The connection terminals of the slot windings may be processed and shaped for easier connection. The package is coupled mechanically to the stator by connecting the connection ends of the slot windings of the motor through the cavities of the substrate 160. The connection terminals of the slot windings may be connected to intermediate connectors, which are connected to the substrate. The associated slot converters are packaged in or near the sector. The package may have several subassemblies, with each subassembly housing one or more slot converters. The circuits in the package may be cooled by one or more fans coupled to the rotor of the motor (generator), or cooled through other means.

Figure 9:
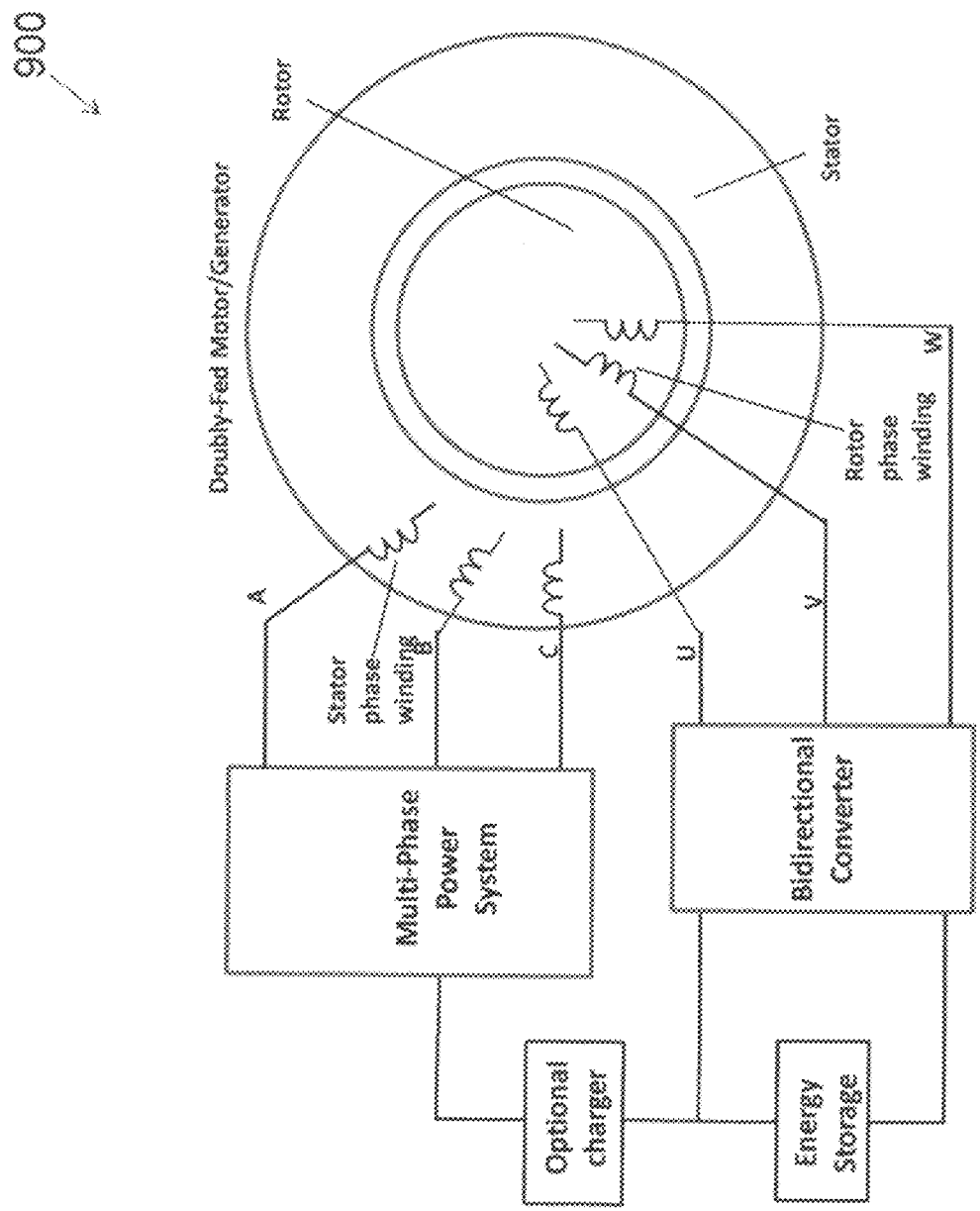
FIG. 9 illustrates a double-fed drive and generation system in accordance with various embodiments of the present disclosure.

The above described techniques can be used in both induction motor and induction generator. For example, in doubly-fed generators found in many applications, the number of phase may be decided by the system to which the stator windings are connected to, but the number of poles may be changed dynamically by electronic switches to reconfigure winding connections in both rotor and stator. The switches for the rotor and their control circuit may be coupled to the rotor mechanically. Moreover, it may be desired to have energy storage in a power generator such as in wind power applications, so the power delivered to the system will be more consistent and have less fluctuation with lower peaks. Traditionally, the energy storage is coupled to the system through dedicated power processing equipment, which results in additional costs. It is desirable to integrate the energy storage with the generator system to reduce system cost. FIG. 9 shows a block diagram of a system with energy storage coupled to the rotor windings in a multi-phase system (three phases are shown as an example). There may be an optional charger coupled between the system and the energy storage, but its power rating would be much smaller than in a stand-alone energy storage system. By controlling the currents and voltages of the rotor windings, the position, strength, and rotation speed of the magnetic field generated by the rotor can be controlled, so the power flow between the energy storage, the system, and wind source can be controlled. The poles may be configured dynamically to change the synchronous speed to optimize system performance over a wide speed range a wind turbine is required to operate. When the wind is strong, more power can be obtained from the wind, and the rotor runs at a speed higher than the synchronous speed of the stator field. The rotor should be controlled to generate a field rotating in the opposite direction of the stator field, with the speed equal to the difference between the rotor's mechanical speed and the stator field's synchronous speed. In this way, part of the wind power is send to the power system electrically coupled to the stator windings, and part of the wind power is send to the energy storage (usually batteries) coupled to the stator windings. When the wind power is moderate, the rotor should be controlled to rotate at or slightly below the synchronous speed of the stator field, so the wind power is delivered to the system through the stator. Some power may be also drawn from the energy storage, and from the optional charger connected to the energy storage if necessary. When the wind power is low, the rotor speed may be significantly lower than the synchronous speed of the stator field. The wind power is delivered to the power system electrically coupled the stator, and significant power is drawn from the energy storage, and from the optional charger is necessary, through the rotor windings and delivered to the stator windings. In this mode, as long as more power is drawn from the wind than lost in the system, there is positive energy gain. This allows the wind power generator to harvest more energy than possible without energy storage. The control of pole numbers (and thus the synchronous speed of the magnetic field generated by the stator winding currents) allows the rotor windings and their associated power converter to operate over a smaller frequency range than otherwise would be required. When the wind is too low to be utilized, energy from the storage can still be transferred to the stator when the rotor is stalled by proper control of the rotor winding currents.

This concept can also be used for other doubly-fed power generators with variable speed, such as backup diesel generators or gas turbines together with battery energy storage, with their performance being optimized in a wide speed range, by variable number of poles and optimized use of energy storage.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electrical machine comprising:
    a rotor; and
    a stator magnetically coupled to the rotor and having a plurality of slots and a plurality of windings, wherein:
        each winding is installed in a corresponding slot;
        a plurality of magnetic poles and a plurality of phases in each pair of poles are formed when currents flow through the windings; and
        the windings are configured such that the number of phases and the number of poles can be dynamically adjusted by controlling the phase relationship of the currents and voltages between the windings through power converters coupled to the windings.

2. The electrical machine of claim 1, wherein a winding in a slot on the stator is coupled to a connection ring on one end.

3. The electrical machine of claim 1, wherein the number of poles is determined by the currents flowing through the windings and the number of phases in each pair of poles is determined by currents flowing through the windings of the pair of poles.

4. The electrical machine of claim 1, wherein the electrical machine is a motor.

5. The electrical machine of claim 1, wherein a slot contains one conductor.

6. The electrical machine of claim 5, wherein a slot contains multiple conductors.

7. The electrical machine of claim 5, wherein windings in two adjacent slots are connected in parallel.

8. The electrical machine of claim 5, where the winding is casted or molded into the slot.

9. A system comprising:
    an electrical machine having a stator, wherein the stator has a plurality of slots, wherein the windings are so configured that the number of phases and the number of poles of the electrical machine can be dynamically adjusted; and
    a power electronics system comprising a control system and a plurality of power converters, wherein a power converter is coupled to a corresponding winding of the electrical machine, and the control system is configured to dynamically adjust the number of poles and the number of phases of the electrical machine,
    by controlling phase relationships of currents and voltages between the windings through the power converters coupled to the windings.

10. The system of claim 9, wherein the control system determines the number of poles according to a speed of the motor.

11. The system of claim 10, wherein the control system determines the number of phases according to the number of poles.

12. The system of claim 10, wherein the frequency of a winding current is adjusted in response to a speed of the motor.

13. The system of claim 11, wherein the number of phases of a first pair of poles is different from the number of phases from a second pair of poles.

14. The system of claim 9, wherein the power converter comprises a plurality of slot power converters, wherein each slot power converter is coupled to a corresponding winding installed in a slot.

15. The system of claim 14, wherein the power converter is packaged onto a substrate mechanically attached to the stator, and wherein the substrate has a cavity through which a slot power converter is coupled to a winding of the stator.

16. The system of claim 14, wherein a plurality of power converters are de-activated during a mode of operation.

17. A method comprising:
    providing a power electronics system to have a plurality of power converters coupled to an electrical machine and a control system; and
    controlling winding currents of the electrical machine so that the electrical machine has a first number of poles at a higher speed, and a second number of poles at a lower speed, wherein the first number is lower than the second number, and wherein the number of phases in a pair of poles is adjusted in response to a change of the number of poles,
    dynamically controlling phase relationships of the currents and voltages through the power converters coupled to the windings.

18. The method of claim 17, wherein a power converter is coupled to a corresponding winding of the motor.

19. The method of claim 18, wherein winding currents in a pair of poles of the motor are controlled collectively as a subsystem.

20. The method of claim 19, wherein the number of poles, the frequencies of winding currents, and the number of phases in each pair of poles are adjusted simultaneously.

* * * * *